Figure 2:
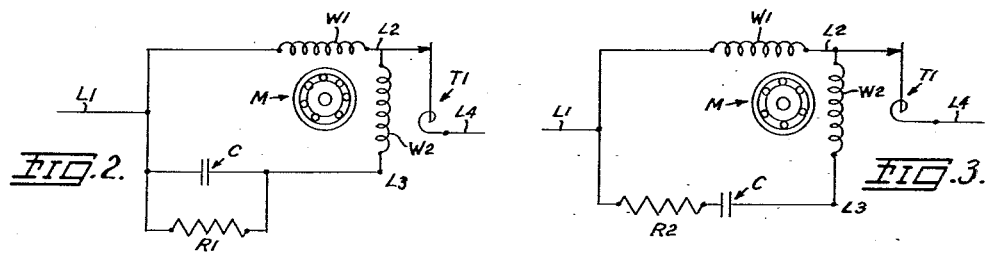

Oct. 15, 1957

R. J. WRIGHT 2,810,104

SPEED CONTROL SYSTEM

Filed April 24, 1956

INVENTOR
Ralph J. Wright

BY

AGENT

United States Patent Office 2,810,104
Patented Oct. 15, 1957

2,810,104

SPEED CONTROL SYSTEM

Ralph J. Wright, Portland, Oreg., assignor to Iron Fireman Manufacturing Company, Portland, Oreg.

Application April 24, 1956, Serial No. 580,216

1 Claim. (Cl. 318—220)

This invention relates generally to methods of controlling the speed of rotating machinery and more particularly to means for controlling the speed of electric motors. Specifically in the form here disclosed the invention comprises the discovery of a method for adjusting either continuously or step-by-step the speed of a single phase, permanent split, capacitor run, induction motor and the invention of means for practicing the invention.

The type of motor with which this invention is concerned is a motor designed to be powered by a single phase alternating current electric source and to have two distinct primary windings connected in parallel across the supply line. The windings are positioned physically in quadrature on the primary iron of the motor and a capacitor in service with one of the windings is selected in size to cause the current in that winding to lead the current in the other winding in approximately time quadrature.

The art in which the motors for which the present speed control is invented is that of residential air conditioning in which the fan motors are from one-sixth to one-half horsepower in size.

In the forced circulation warm air furnace art it is found expedient not to build a different furnace of each size of home but to build a line of furnaces separated in sizes by ratios thought best by the particular designer. Thus a furnace capable of supplying one hundred thousand B. t. u.'s of heat per hour may be used with peak loads of only sixty thousand B. t. u.'s of heat per hour. Also the fans of these furnaces may be required to run at two speeds, one speed to supply air circulation and some ventilation over longer periods interspersed with runs at higher speeds to supply air at higher temperature for heat buildup in the house for comfort. If the fan motor is satisfactorily efficient at its highest rating it makes little difference if its efficiency is reduced somewhat at lower speeds for it will have plenty of power and some extra electric power loss is all heat anyway and not economically important.

In working with a motor of this type for the purpose noted it was accidentally discovered that a relatively high resistance found across the capacitor of the winding had usefully reduced the speed of the motor without harmful effect and with relatively inexpensive material. Then a thorough analysis of the electrical and mechanical characteristics of the motor was made and followed by actual tests with the result that the practical value of the discovery of this most economical and desirable system of speed control for small motors direct connected to furnace fans was made certain.

It is a primary object of this invention to provide for the type of motor disclosed a speed control system which will at relatively small cost adjust the speed of the motor to a desired value for the particular load with which the motor is to be used.

It is a second object to provide such a system with which the desirable speed for a motor with a given load can be selected at will and fixed in the field.

It is a third object to provide such a system with which the speed of the motor can be changed to as many differently used speeds as is desired.

It is a fourth object to provide such a system with which the desired motor speed or speeds can automatically be selected in response to variations in a condition.

Figure 1:
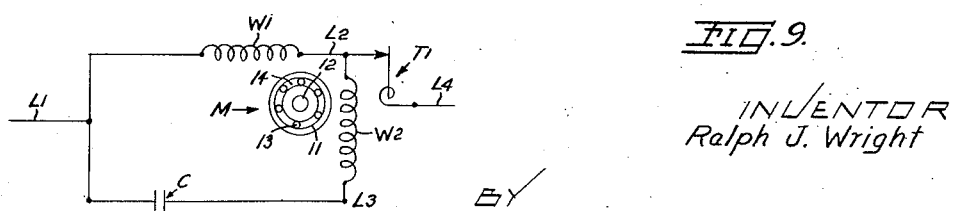

How these and other objects are attained is explained in the following description referring to the attached drawing in which Fig. 1 is a schematic electrical diagram of a motor of the type to which this invention is adapted and Figs. 2 to 9 show schematically some of the ways in which my invention may be practiced for the purposes described.

Like reference numerals refer to like parts in the several figures of the drawing.

In each of the figures of the drawing there is shown schematically a single phase alternating current source of power L1, L4, to which is connected through a thermostat T1 the two parallel circuits of primary windings W1 and W2 of a single phase, alternating current, permanent split, capacitor run, induction motor having a secondary structure M here indicated in Fig. 1, as a rotating iron structure 11 on a shaft 12 and with secondary winding bars 13 short circuited by end rings 14. Windings W1 and W2 are physically positioned on the rotor ninety electrical degrees apart and in accordance with well known electrical theory for the windings W1 and W2 to set up a rotating electrical field to cause the motor to operate at best load carrying ability the currents in windings W1 and W2 must be approximately ninety degrees apart in time phase. Again in accordance with well known electrical theory and as previously noted the capacitor C is connected in series with winding W2 in its circuit parallel to W1 to cause the current from source L1, L4 through winding W2 and capacitor C to lead the current from sources L1, L4 through winding W1 in time phase. Capacitor C and the number of turns of winding W2 are chosen for economic reasons but with the result that at full load on the motor the ampere turns of windings W1 and W2 will be approximately the same and the cosine of the angle in time phase between the currents through windings W1 and W2 will be at least ninety percent.

If the carefully selected relations between the resistance inductance and capacity of the W2 circuit are changed from the selected optimum position the motor torque capability will be reduced or at a given load torque within the stability torque speed range of the motor the speed will be reduced.

The present invention provides means for lowering the pull out torque of the motor with or without a similar reduction in the starting torque and without changing the speed of the motor at which the maximum or pull out torque occurs. This is not the same as varying the resistance of the secondary winding of an induction motor to lower the speed at which maximum torque occurs without reducing the maximum torque. The distinction should be clearly understood for general purpose motors practicing the present invention would have to be designed for the minimum required speed capability by varying the rotor resistance and then will be provided by the scheme of the present invention with means for varying the speed for a given torque from the speed of pull out to the highest speed at which the motor can pull the load.

However for a motor required to drive a furnace fan to deliver a design air C. F. M. against a design static pressure and then to deliver a lower C. F. M. without any adjustment of the resistance of the system to air flow the speed vs. torque requirements of the fan and the speed vs. torque delivery of a motor whose speed is controlled by the system of this invention are such that speed stability is assured. It is thus seen that for circulating air fan drives for air conditioning and ventilation the present motor and control system is well adapted and has the advantage of low first cost, low installation cost and low maintenance cost.

In explanation of the practice of the present invention it should be noted that commonly the windings W1 and W2 are made an integral part of the motor stator and that capacitor C is usually separately mounted. Terminals L1, L2 and L3 are available at the terminal block of the motor and in the common form of this type of motor capacitor C external to the motor is connected to motor terminals L1, L3 as shown in Fig. 1. With the motor shaft connected mechanically to drive the circulating air fan of a warm air furnace and the thermostat T1 in the circulating air leaving the furnace it is seen that the motor will start when the air attains a pre-set temperature and will stop when the air temperature falls to the same temperature. It is of course understood that the furnace burner will be under the control of a space thermostat which will start and stop the fuel and air supply to the furnace as required.

Figure 3:
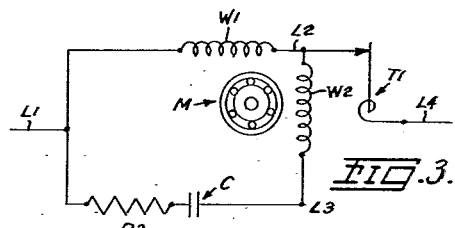

By proper selection of the resistances used it has been found that the speed of the motor for a given torque output can be reduced satisfactorily by paralleling the capacitor C by a resistance R1 as shown in Fig. 2 or placing a resistance R2 in series in the circuit of C and W2 as shown in Fig. 3. Either scheme can be used permanently to reduce the capacity of a furnace fan driven by the motor in order to fit a furnace to a house requiring less than the full capacity of the furnace.

Figure 4:
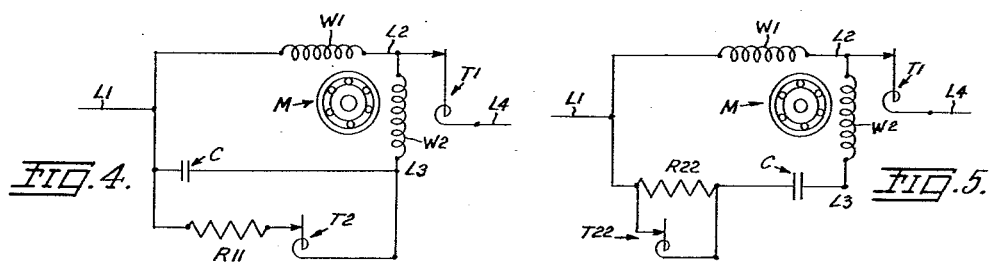
Figure 5:
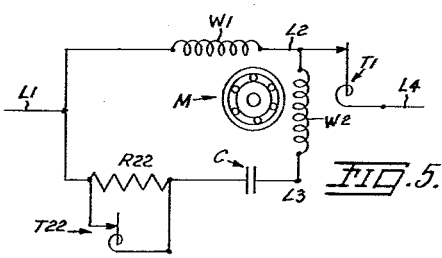

Or if the fan is approximately the size required by the house but it is desired to start the fan at a lower air temperature and lower speed and then to increase the fan speed and capacity as the air temperature rises to a higher selected value then the additional thermostats T2 and T22 of Figs. 4 and 5 may be added. In starting up a cold furnace associated with a control scheme like Fig. 4, thermostat T2 will be closed and the fan motor will start at low speed when the air reaches the temperature for which thermostat T1 is set to close. Then as the air temperature continues to rise and reaches that for which the thermostat T2 is set this thermostat will open taking resistance R11 out of use and the motor speed will rise to full load condition. Reversely in Fig. 5 when the air temperature reaches that for which thermostat T22 is set the thermostat will close, short circuiting resistance R22, and the motor speed will change from low to high.

Again if the fan at full motor speed is too large for the house and it is also desired to operate the fan at two speeds according to the temperature of the air circulating from the furnace. Any of the schemes of Figs. 6, 7, 8, or 9 may be used.

Figure 6:
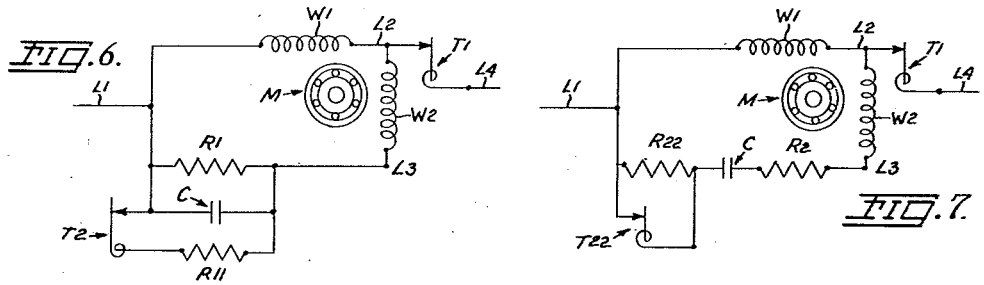

In Fig. 6 the resistor R1 is selected to adapt the higher motor speed to the house and this resistor is in parallel with capacitor C at all times, as described for Fig. 2. Resistor R11, in series with thermostat T2 and both in parallel with capacitor C additionally operate to give a lower speed at a lower air temperature as described for Fig. 4.

Figure 7:
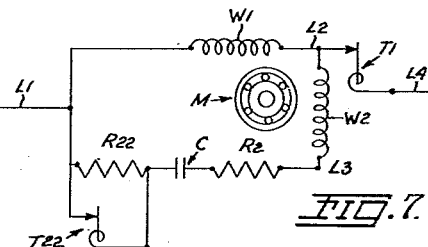

In Fig. 7 the resistor R2 is selected to adapt the higher motor speed to the fan requirements of the house and this resistor is in series circuit arrangement with winding W2 and capacitor C as described for Fig. 3. Resistor R22 in series with C, R2 and W2 and paralleled by thermostat T22 additionally operates to give a lower speed at a lower air temperature as described for Fig. 5.

Figure 8:
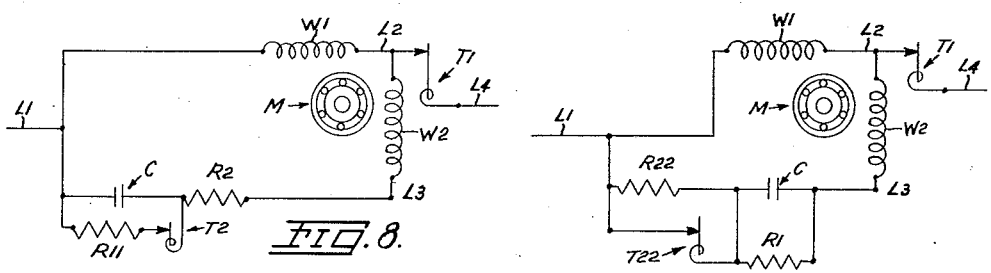

In Fig. 8, the resistor R2 is selected to adapt the higher motor speed to the fan requirements of the house and this resistor is in series circuit arrangement with winding W2 and capacitor C as described for Fig. 3. Resistor R11 is in series with thermostat T2 and both in parallel with capacitor C additionally operate to give a lower speed at a lower air temperature as described in Fig. 4.

Figure 9:
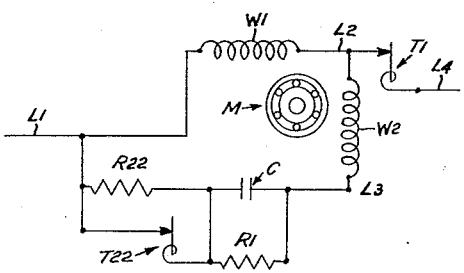

In Fig. 9 the resistor R1 is selected to adapt the higher motor speed to the house and this resistor is in parallel with capacitor C at all times as described for Fig. 2. Resistor 22 in series with C and W2 and in parallel with thermostat T22 additionally operates to give a lower speed at a lower air temperature as described in Fig. 5.

While for all practical purposes it probably will be satisfactory to use fixed resistors each selected in resistance value for the purpose it had and to use plain on-off thermostats either direct or reverse acting as suggested it is also suggested for specific uses that variable resistors with sliding contact thermostats may be used. Such variations in practice are standard equivalents practiced in the art and are not thought to be patentably differentiated from the schemes shown.

Also of course the number of distinct speed steps are a matter of desire.

Having thus listed some of the objects of my invention, illustrated and described several ways in which the system of my invention may be practiced and described the operation thereof, I claim:

A speed control system comprising a single phase, alternating current, permanent split, capacitor run, induction motor, having a stator wound with two windings physically positioned approximately ninety electrical degrees apart, a capacitor connected in a series circuit with one of said windings, said circuit and the other of said windings being adapted to be connected in parallel to a source of single phase power to cause alternating currents displaced approximately ninety degrees in time phase to circulate respectively through said other winding and said circuit together with an electrical resistor connected in series with said capacitor in said circuit to change the degree spread in time phase of said currents in said winding and said circuit to change the speed versus torque characteristic of said motor, and a condition responsive switch connected in parallel with said resistor alternately to remove said resistor from said circuit and restore said resistor to said circuit.

References Cited in the file of this patent

UNITED STATES PATENTS

| | | |
|---|---|---|
| 2,549,265 | Trant | Apr. 17, 1951 |
| 2,576,084 | Trevilt | Nov. 20, 1951 |
| 2,704,345 | Jensen | Mar. 15, 1955 |

FOREIGN PATENTS

| | | |
|---|---|---|
| 415,853 | Great Britain | Sept. 6, 1934 |